United States Patent

Wakui

[11] Patent Number: 5,994,494
[45] Date of Patent: Nov. 30, 1999

[54] ANTISETTLING AGENT FOR AQUEOUS PAINTS

[75] Inventor: Toshimitsu Wakui, Soka, Japan

[73] Assignee: Kusumoto Chemicals, Ltd., Tokyo, Japan

[21] Appl. No.: 09/074,372

[22] Filed: May 8, 1998

[30] Foreign Application Priority Data

May 9, 1997 [JP] Japan ................................ 9-135926

[51] Int. Cl.$^6$ ........................ C08G 69/26; C08F 22/00; C08L 77/06
[52] U.S. Cl. ...................... 528/332; 528/310; 528/322; 528/335; 528/336; 524/600; 524/606; 524/608; 525/329.5; 525/330.2
[58] Field of Search .................... 528/332, 322, 528/310, 335, 336; 524/600, 606, 608; 525/329.5, 330.2

[56] References Cited

U.S. PATENT DOCUMENTS 5,374,687 12/1994 Cooperman et al. ................ 525/330.2

FOREIGN PATENT DOCUMENTS 4028386 3/1992 Germany.
234461 8/1992 Japan.

OTHER PUBLICATIONS

Versadyme®, Aliphat®, Versamid®, Genamid®, Versamine®, Macromelt®, Polymer Div. Henkel Hakusui Corp. pp. 1–10, Jun. 1989.

Japanese language publication, "Toso Gijutsu" (coating technology), 35(6), 82–83 (1966) and partial English translation thereof the month in the date of the publication is not available.

Japanese language publication, "Toso Gijutsu" (coating technology) 35(6), 84–85 (1966 and partial English translation thereof the month in the date of the publication is not available.

Japanese language publication "Toso to Toryo" (coating and paint), No. 494(7), 49–52 (1992) and partial English translation thereof the month in the date of the publication is not available.

*Primary Examiner*—P. Hampton-Hightower
*Attorney, Agent, or Firm*—Sherman and Shalloway

[57] ABSTRACT

An antisettling agent for aqueous paints giving excellent settling-preventing properties to aqueous paints is provided. The antisettling agent is produced by the following process: A polyamide, which is obtained by reacting a primary diamine having 2 to 12 carbon atoms with, in an amount excess to the diamine, a dimer dicarboxylic acid obtained by polymerizing an unsaturated fatty acid (common name: dimer acid) or a mixture of a dimer acid with another dicarboxylic acid having 3 to 21 carbon atoms and/or a monocarboxylic acid having 2 to 22 carbon atoms, is neutralized with a neutralizing base, and then the neutralized polyamide is dispersed in a medium mainly composed of water.

13 Claims, No Drawings

ANTISETTLING AGENT FOR AQUEOUS PAINTS

This invention relates to an antisettling agent for aqueous paints which, when added, for example to an aqueous metallic paint, an aqueous corrosion-resistant paint or the like, prevents the settling of the pigment in the aqueous paint, without spoiling the sharpness and water resistance of the paint film.

Aluminum pigments or pearlescent pigments such as mica used in metallic paints, or corrosion-resistant pigments used in corrosion-resistant paints are such that the particle size of the pigment is large and the specific gravity thereof is also large, and therefore, settling readily occurs in paints. It is well-known that, in solvent type paints, amide wax type or polyethylene oxide wax type antisettling agents are used for preventing settling, but many of these additives are unsuitable for use in aqueous paints.

As antisettling agents for aqueous paints are proposed inorganic antisettling agents such as clay series ones shown in "Toso Gijutsu, 35(6), 82–83 (1996)" and "Toso Gijutsu, 35(6), 84–85 (1996)" or silica series ones shown in "Toso to Toryo, No. 494(7), 49–52 (1992)". However, these inorganic additives have defects, e.g. that they cause the lowering of luster or they are hard to add after the preparation of paints.

Further, it is disclosed in Japanese Laid-open Patent Publication No. 234461/1992 that by using hydrophilic colloidal silica and, as a surfactant, a water soluble or water dispersible nonionic fluorinated hydrocarbon polymer containing ethylene oxide linkage, it is possible to retard the settling of the pigments in metallic paints and improve the stability and performance of the paints. However, since an inorganic silica is used, there is a problem of dust.

In U.S. Pat. No. 5,374,687, a substance obtained by neutralizing with a neutralizing agent an emulsifying copolymer obtained from an α-olefin and an α, β-ethylenic unsaturated carboxylic acid is shown as an aqueous antisettling agent. This additive is liquid and thus has an advantage on handling, but it is insufficient in effect as an antisettling agent for aluminum pigments or pearlescent pigments such as mica used in aqueous metallic paints. It is described in the description of the prior art of the patent that there are, as antisettling agents for aqueous paints, emulsifying polyethylene waxes, fumed silica, clay, natural gum, cellulose derivatives, acrylic acid-acrylic ester copolymers, derivatives of reaction products of an unsaturated alcohol and an ethylenedicarboxylic acid, waxes, etc.

In recent years, examination of aqueous paints has actively been made because of environmental problems, danger of fires, etc., and also on antisettling agents, aqueous ones are naturally sought. Although, as stated above, various ones have hitherto been proposed as aqueous antisettling agents, they have had problems, e.g. that they are insufficient in effect to prevent the settling of pigments having large particle sizes and large specific gravities, for example, aluminum pigments and pearlescent pigments such as mica used in aqueous metallic paints, corrosion-resistant pigments used in aqueous corrosion-resistant paints, luster is lowered, water resistance is lowered.

In search of novel antisettling agents for aqueous paints to resolve such problems, the present inventor has succeeded in finding an antisettling agent for aqueous paints which prevents the settling of pigments used in aqueous metallic paints or aqueous corrosion-resistant paints and has almost no influence on the luster and water resistance of the paint film, and have come to complete the present invention. Namely, the invention aims to provide an antisettling agent for aqueous paints which gives excellent settling-preventing properties to aqueous paints and has little bad influence on the physical properties of paint film.

The antisettling agent for aqueous paints of the invention is obtained by neutralizing with a neutralizing base a polyamide obtained by reacting a carboxylic acid with a diamine, and then dispersing the neutralized polyamide in a medium mainly composed of water.

More specifically, by the present invention is provided an antisettling agent for aqueous paints obtained by neutralizing a polyamide, which is obtained by reacting a primary diamine having 2 to 12 carbon atoms with, in an amount excess to the diamine, a dimer dicarboxylic acid obtained by polymerizing an unsaturated fatty acid (common name: dimer acid) or a mixture of a dimer acid with another dicarboxylic acid having 3 to 21 carbon atoms and/or a monocarboxylic acid having 2 to 22 carbon atoms, with a neutralizing agent, and then dispersing the neutralized polyamide in a medium mainly composed of water.

Dimer acids used in the invention can be obtained by dimerizing unsaturated fatty acids, and ones generally put on the market can be used. Although monomer acids and trimer acids are contained besides dimer acids in dimer acids on the market, ones having a high dimer acid content are preferred.

In polyamides in the invention, dimer acids are used as carboxylic acids, but dicarboxylic acids other than dimer acids or monocarboxylic acids can be used together. As dicarboxylic acids, there can be used higher dicarboxylic acids having 21 or less carbon atoms besides succinic acid, glutaric acid, adipic acid, pimelic acid, suberic acid, azelaic acid, sebacic acid, dodecanedioic acid, isophthalic acid, etc. As monocarboxylic acids, there can be used acetic acid, butyric acid, caproic acid, caprylic acid, capric acid, lauric acid, myristic acid, palmitic acid, stearic acid, behenic acid, 12-hydroxystearic acid, oleic acid, etc.

As carboxylic acids in the polyamides, dimer acids may be used solely, but dimer acids can also be used as mixtures with other dicarboxylic acids and/or monocarboxylic acids. When mixed carboxylic acids are used, compounding is made so that the mole ratio of the dimer acid contained in the total carboxylic acids may be 50% or more. When the mole ratio of the dimer acid is less than 50%, sufficient settling-preventing effect is not obtained or the preparation of stable additives gets to be difficult.

As examples of primary diamines used in the invention, there can be used ethylenediamine, 1,4-diaminobutane, hexamethylenediamine, 1,10-decamethylene-diamine, 1,11-undecamethylenediamine, 1,12-dodecamethylenediamine, xylylenediamine, 4,4'-diaminodiphenylmethane, etc.

The mole ratio of the total carboxylic acids to the primary diamine is made to be in the range of 5:4 to 2:1. When the amount of the total carboxylic acids is smaller than the mole ratio of the total carboxylic acids to the primary diamine being 5:4, the preparation of stable antisettling agents becomes difficult, or settling-preventing effect is lowered. On the other hand, when the amount of the total carboxylic acids is larger than the mole ratio of the total carboxylic acids to the primary diamine being 2:1, it becomes a cause of the lowering of the water resistance of paint film, or in some paints, gel structure having roping properties is formed when the resultant antisettling agents are compounded thereinto.

As the polyamide in the invention, one having an acid value in the range of 30 to 120 is used. Preferably used is one having an acid value of 40 to 100, and more preferably used is one having an acid value of 50 to 90.

The reaction of an above-mentioned primary diamine with a dimer acid or a mixture of a dimer acid with another dicarboxylic acid and/or a monocarboxylic acid, in an excess amount to the diamine, for the synthesis of the polyamide in the invention, can be carried out in a process well-known by persons skilled in the art. For example, the reaction can be carried out by reacting a mixture of the diamine with the carboxylic acid at a temperature of 150 to 200° C. for 3 to 5 hours, and in this occasion, a dehydration aid such as xylene can, if necessary, be used.

A polyamide obtained by the above process has little crystallinity but is a solid at room temperature. According to the invention, this polyamide is dispersed in a medium mainly composed of water.

As methods to disperse the polyamide uniformly in the medium, there are a method to carry out the dispersion in one stage and a method to carry out the dispersion in two stages. The method to carry out the dispersion in one stage is a method which comprises neutralizing the synthesized polyamide with a neutralizing base at a temperature of 70 to 140° C., and then, if necessary after a proper organic solvent is added to lower the viscosity of the polyamide salt, adding the mixture into warm water under stirring. In the method to carry out the dispersion in two stages, the synthesized polyamide is neutralized with a neutralizing base at a temperature of 70 to 140° C., and, if necessary after a proper organic solvent is added to lower the viscosity of the polyamide salt, cooling the mixture once to room temperature, and then heating the, generally solid, polyamide salt or polyamide salt mixture cooled to room temperature to 70 to 140° C. to make it liquid, and adding it into warm water under stirring to disperse it.

It depends on productive efficiency and equipment whether, when the polyamide is dispersed in a medium, the one-stage method is used or the two-stage method is used, and when any of the methods is used, the performance of the resultant antisettling agent is not influenced.

As neutralizing bases used for the neutralization of the polyamide, there can be used bases generally used as neutralizing bases in aqueous paints. There can, for example, be mentioned amines such as triethylamine and 2-dimethylaminoethanol, and inorganic bases such as sodium hydroxide and potassium hydroxide.

The polyamide salt formed by neutralizing the polyamide with a base can be dispersed as such in warm water, but it is also possible to add an organic solvent to lower the viscosity of the polyamide salt and then disperse the mixture into warm water. The purpose of lowering the viscosity of the polyamide salt is to facilitate the handling and facilitate the dispersion into warm water.

As organic solvents used for the above purpose, there can be mentioned aliphatic hydrocarbons, alicyclic hydrocarbons and aromatic hydrocarbons or mixtures thereof, ketones, esters, alcohols, ethers, etc., but organic solvents used in aqueous paints are preferred, and for example, propylene glycol monomethyl ether is mentioned.

The temperature of the polyamide salt or polyamide salt mixture to be dispersed in warm water is suitably 70 to 140° C. At temperatures lower than 70° C., the viscosity of the polyamide salt or polyamide salt mixture becomes high and it becomes hard to handle. When it is used at temperatures higher than 140° C., it becomes a cause of foaming when added into warm water.

The temperature of warm water to which the polyamide salt or polyamide salt mixture is added is suitably in the range of 60 to 95° C., and particularly preferably in the range of 70 to 90° C. In temperatures lower than 60° C., the dispersion of the polyamide salt or polyamide salt mixture is bad, and in temperatures higher than 95° C., there can be a case where the preparation of the antisettling agent is hindered due to foaming.

When the polyamide salt or polyamide salt mixture is added into warm water, it is generally dispersed immediately, but the stirring is continued at a temperature of 70 to 90° C. for the order of 30 minutes to 1 hour for making the dispersion complete.

The thus obtained polyamide dispersion was cooled to a proper temperature in the range of 40 to 70° C., and transferred into a vessel in the state of liquid. When this dispersion is left alone at room temperature, it generally becomes a solid paste in the order of several hours to 1 day in the case where the rate of the polyamide in the additive is 20% by weight.

For the purpose of the improvement of dispersibility in paints, the retainability of the luster of paint film, the dispersibility of the pigment, the defoaming properties of paints, the leveling of paint films at vertical plane, etc., a surfactant and/or various additives can be added to the antisettling agent for aqueous paints.

Paints suitable for the use of the antisettling agent for aqueous paints obtained in the invention are aqueous metallic paints and aqueous corrosion-resistant paints, wherein pigments having large particle sizes and large specific gravities, for example, aluminum pigments, pearlescent pigments such as mica, corrosion-resistant pigments, etc. are used, but in addition, the antisettling agent can also be applied to aqueous paints wherein general color pigments and/or extender pigments are used.

The time when the antisettling agent for aqueous paints of the invention is added to a paint may be the stage of kneading a pigment or may be after the preparation of a paint, and further it is also possible to make a masterbatch and add it. The addition temperature can be in the range of from room temperature to 80° C., and as dispersing machines, there can be used ones generally used in the preparation of paints.

The addition amount of the antisettling agent varies depending on the kind of paints and performance required thereon, but usually, the amount is suitably 0.25 to 5% by weight, particularly preferably 0.5 to 3% by weight in terms of the polyamide based on the paint vehicle.

When the addition amount is smaller than 0.25% by weight, settling-preventing effect is not sufficient, and when it is larger than 5% by weight, there can be a case where bad influences such as the increase of the viscosity of the paint and the lowering of the luster thereof occur.

EFFECT OF THE INVENTION

By using the antisettling agent for aqueous paints of the invention, it is possible to prevent the settling of pigments having large particle sizes and large specific gravities, for example, aluminum pigments and pearlescent pigments such as mica used in aqueous metallic paints, corrosion-resistant pigments used in aqueous corrosion-resistant paints, and the preparation of paints having little lowering of the sharpness and/or water resistance of paint film is made possible.

The invention is further detailedly described below according to examples. "part" and "%" in the following show "weight part" and "% by weight", respectively.

POLYAMIDE SYNTHESIS EXAMPLE 1

283.2 Parts (0.48 mole) of a dimer acid (made by Henkel Japan Co., Ltd., trade name: Versadyme 228, which is the same hereinafter) and 56.6 parts (20% of the total carboxylic acids, which is the same hereinafter) of xylene were put in a 1-liter four-necked flask equipped with a stirring apparatus, a thermoregulator, a diversion device and a nitrogen-introducing tube, and heated to 50° C. to make a solution. (Versadyme 228 is a dimer acid of $C_{18}$ unsaturated fatty acid.) Then, 19.2 parts (0.32 mole) of ethylenediamine was added gradually, and the mixture was stirred at 130 to 140° C. for 10 minutes. The mixture was further gradually heated to 175° C. to carry out dehydration reaction. A palely brown polyamide (acid value: 64) obtained by 4 hours reaction was cooled up to 120° C., 28.5 parts (0.32 mole) of 2-dimethylaminoethanol and 145.4 parts (50% of the polyamide, which is the same hereinafter) of propylene glycol monomethyl ether were added, and the mixture was stirred at 85 to 95° C. for 30 minutes. Thereafter, the mixture was once cooled to room temperature, and an antisettling agent for aqueous paints was prepared by a two-stage method.

EXAMPLE 1

136.1 Parts of deionized water was put in a 500-ml four-necked flask equipped with a stirring apparatus, a cooling pipe and a thermometer, and heated to 75° C. Separately, 63.9 parts of the above polyamide amine salt mixture was heated to 90° C. to make it liquid, and gradually added into the above warm water under stirring. The polyamide amine salt mixture was immediately dispersed, but, for making the dispersion complete, the stirring was continued in the temperature range of 75 to 85° C. for 30 minutes. After the completion of the dispersion, the mixture was cooled to 60° C., transferred into a vessel, and left alone at room temperature to give a desired antisettling agent for aqueous paints. This was a solid paste in observation after one day.

POLYAMIDE SYNTHESIS EXAMPLES 2 to 9

Polyamides were obtained according to the synthesis process of the Polyamide Synthesis Example 1, using the compounding ratios of Table-1, respectively.

EXAMPLES 2 to 10

Antisettling agents for aqueous paints were obtained using the same process as in Example 1 and the compounding ratios of Table-2, respectively.

POLYAMIDE SYNTHESIS COMPARATIVE EXAMPLE 1

283.2 Parts (0.48 mole) of the dimer acid and 56.6 parts of xylene were put in a 1-liter four-necked flask equipped with a stirring apparatus, a thermoregulator, a diversion device and a nitrogen-introducing tube, and heated to 50° C. to make a solution. Then, 46.5 Parts (0.40 mole) of hexamethylenediamine melted with heating was added gradually, and the mixture was stirred at 130 to 140° C. for 10 minutes. The mixture was gently heated up to 175° C. to carry out dehydration reaction. A palely brown polyamide (acid value: 31) obtained by 4 hours reaction was cooled up to 120° C., 14.3 parts (0.16 mole) of 2-dimethylaminoethanol and 157.7 parts of propylene glycol monomethyl ether were added, and the mixture was stirred at 85 to 95° C. for 30 minutes. Thereafter, the mixture was once cooled to room temperature, and an antisettling agent for aqueous paints was prepared by a two-stage method.

COMPARATIVE EXAMPLE 1

138.2 Parts of deionized water was put in a 500-ml four-necked flask equipped with a stirring apparatus, a cooling pipe and a thermometer, and heated to 75° C. Separately, 61.8 parts of the above polyamide amine salt mixture was heated to 90° C. to make it liquid, and gradually added into the above warm water under stirring. After the completion of the addition, the stirring was continued in a temperature range of 75 to 85° C. for 30 minutes. After the completion of the dispersion, the mixture was cooled to 60° C., transferred into a vessel, and left alone at room temperature. In observation after one day, this became ununiform because of the separation of the polyamide, and thus showed a state such that it could not be used as an antisettling agent for aqueous paints.

POLYAMIDE SYNTHESIS COMPARATIVE EXAMPLE 2

A polyamide (acid value: 121) was obtained according to the synthetic process of Polyamide Synthesis Example 1 using 354.0 parts (0.60 mole) of the dimer acid, 24.4 parts (0.21 mole) of hexamethylenediamine and 70.8 parts of xylene. 69.5 Parts (0.78 mole) of 2-dimethylaminoethanol and 185.4 parts of propylene glycol monomethyl ether were added to this polyamide to give a polyamide amine salt mixture, and the mixture was once cooled to room temperature.

COMPARATIVE EXAMPLE 2

An antisettling agent for comparison was obtained from 67.5 parts of the above polyamide amine salt mixture and 132.5 parts of deionized water according to the preparation process of Example 1.

POLYAMIDE SYNTHESIS COMPARATIVE EXAMPLE 3

A polyamide (acid value: 157) was synthesized according to the synthetic process of Example 1 using 177.0 parts (0.30 mole) of the dimer acid, 131.7 parts (0.70 mole) of azelaic acid, 58.1 parts (0.50 mole) of hexamethylenediamine and 61.8 parts of xylene. While the temperature of this polyamide is maintained in the range of 125 to 135° C., 44.6 parts (0.50 mole) of 2-dimethylaminoethanol and 174.4 parts of propylene glycol monomethyl ether were added thereto, and the mixture was stirred in the same temperature range for 30 minutes (this polyamide amine salt mixture was solid at temperatures of 125° C. or less). Then, this mixture was once cooled to room temperature.

COMPARATIVE EXAMPLE 3

134.9 Parts of deionized water was put in a 500-ml four-necked flask equipped with a stirring apparatus, a cooling pipe and a thermometer, and heated to 75° C. Separately, 65.1 parts of the above polyamide amine salt mixture was heated to 130° C. to make it liquid, and gradually added into the above warm water under stirring. After the completion of the addition, the stirring was continued in a temperature range of 75 to 85° C. for 30 minutes. After the completion of the dispersion, the mixture was cooled to 60° C., transferred into a vessel, and left alone at room temperature. In observation after one day, this was a fluid paste.

POLYAMIDE SYNTHESIS COMPARATIVE EXAMPLE 4

282.3 Parts (1.50 mole) of azelaic acid and 56.6 parts (20% of azelaic acid) of xylene were put in a 1-liter four-necked flask equipped with a stirring apparatus, a thermoregulator, a diversion device and a nitrogen-introducing tube, and heated to 110° C. to make a solution. Then, 104.6 Parts (0.90 mole) of hexamethylenediamine melted with heating was added gradually, and the mixture was gradually heated to 175° C. to carry out dehydration reaction. A polyamide (acid value: 174) obtained by 4 hours reaction was once cooled to room temperature, and used for the preparation of an anti-settling agent. In the case of this polyamide, it tended to be solid when neutralized with a neutralizing amine, and neutralization was made at the time of the preparation of an antisettling agent.

COMPARATIVE EXAMPLE 4

128.0 Parts of deionized water, 40.0 parts of the above polyamide, 12.0 parts of 2-dimethylaminoethanol and 20.0 parts of propylene glycol monomethyl ether were put in a 500-ml four-necked flask equipped with a stirring apparatus, a cooling pipe and a thermometer, and gradually heated under stirring. After dispersion was carried out at 95° C. for 1 hour, the mixture was cooled up to 85° C., transferred into a vessel, and left alone at room temperature. In observation after one day, this was a solid paste.

TABLE 1

(Polyamide)

| | | Polyamide Synthesis Example | | | | | | | | | | Polyamide Synthesis Comparative Example | | | |
|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 |
| Dimer acid (mole) | | 0.48 | 0.50 | 0.50 | 0.50 | 0.48 | 0.57 | 0.63 | 0.48 | 0.44 | 0.60 | 0.48 | 0.60 | 0.30 | |
| Dicarboxylic acid (mole) | Suberic acid | | | | | | 0.18 | | | | | | | | |
| | Azelaic acid | | | | | | | 0.27 | | | 0.15 | | | 0.70 | 1.50 |
| Monocarboxylic acid (mole) | n-Caproic acid | | | | | | | | 0.18 | | | | | | |
| | 12-Hydroxystearic acid | | | | | | | | | 0.24 | 0.16 | | | | |
| Diamine (mole) | Ethylenediamine | 0.32 | | | | 0.16 | | | 0.36 | | | | | | |
| | Hexamethylenediamine | | 0.30 | | | 0.16 | 0.45 | 0.60 | | 0.36 | 0.55 | 0.40 | 0.21 | 0.50 | 0.90 |
| | 1,12-Dodecamethylenediamine | | | 0.30 | | | | | | | | | | | |
| | 4,4'-Diaminodiphenylmethane | | | | 0.30 | | | | | | | | | | |
| Neutralizing amine (mole) | 2-Dimethylaminoethanol | 0.32 | 0.40 | 0.40 | 0.40 | 0.32 | 0.60 | 0.60 | 0.42 | 0.40 | 0.56 | 0.16 | 0.78 | 0.50 | — |
| Acid value of polyamide | | 64 | 75 | 70 | 72 | 63 | 84 | 73 | 65 | 55 | 60 | 31 | 121 | 157 | 174 |

[Note] In all the Polyamide Synthesis Examples and Polyamide Synthesis Comparative Examples, xylene (20% of the total carboxylic acids) was used as a dehydration aid at the time of polyamide synthesis. In all the Polyamide Synthesis Examples and Polyamide Synthesis Comparative Examples except Polyamide Synthesis Comparative Example 4, propylene glycol monomethyl ether (50% of the polyamide) was used for the purpose of lowering the viscosity of the polyamide amine salt mixture.

TABLE 2

(Antisetting agent for aqueous paints)

| | Polyamide or polyamide amine salt mixture (weight part) | Deionized water (weight part) |
|---|---|---|
| Example 1 | Polyamide amine salt mixture of Polyamide Synthesis Example 1 | 63.9 | 136.1 |
| Example 2 | Polyamide amine salt mixture of Polyamide Synthesis Example 2 | 64.5 | 135.5 |
| Example 3 | Polyamide amine salt mixture of Polyamide Synthesis Example 3 | 64.1 | 135.9 |
| Example 4 | Polyamide amine salt mixture of Polyamide Synthesis Example 4 | 64.2 | 135.8 |
| Example 5 | Polyamide amine salt mixture of Polyamide Synthesis Example 5 | 63.8 | 136.2 |
| Example 6 | Polyamide amine salt mixture of Polyamide Synthesis Example 6 | 65.3 | 134.7 |
| Example 7 | Polyamide amine salt mixture of Polyamide Synthesis Example 7 | 64.4 | 135.6 |
| Example 8 | Polyamide amine salt mixture of Polyamide Synthesis Example 8 | 64.8 | 135.2 |
| Example 9 | Polyamide amine salt mixture of Polyamide Synthesis Example 9 | 63.9 | 136.1 |
| Example 10 | Polyamide amine salt mixture of Polyamide Synthesis Example 10 | 64.2 | 135.8 |
| Comparative Example 1 | Polyamide amine salt mixture of Polyamide Synthesis Comparative Example 1 | 61.8 | 138.2 |
| Comparative Example 2 | Polyamide amine salt mixture of Polyamide Synthesis Comparative Example 2 | 67.5 | 132.5 |
| Comparative Example 3 | Polyamide amine salt mixture of Polyamide Synthesis Comparative Example 3 | 65.1 | 134.9 |
| Comparative Example 4 | Polyamide amine salt mixture of Polyamide Synthesis Comparative Example 4 | 40.0 | 128.0 |

[Note] In Comparative Example 4, 12.0 parts of 2-dimethylaminoethanol and 20.0 parts of propylene glycol monomethyl ether were added at the time of the preparation.

TEST EXAMPLE

Performance tests of the antisetting agents for aqueous paints were carried out on the aqueous acrylic melamine resin paint compositions of the following compositions (weight rates).

| | |
|---|---|
| Coatax WF-268 | 44.1 parts |
| (water soluble acrylic resin made by Toray Co. Ltd.) | |
| Cymel 370 | 6.4 parts |
| (melamine resin made by Mitsui Cytec Co., Ltd.) | |
| Deionized water | 49.5 parts |
| Iriodin 504 | 5.0 parts |
| (metallic pigment sold by Merck Japan Co., Ltd.) | |
| Antisetting agent for aqueous paints | 2.0 parts |
| (one of the products of Examples, Comparative Examples and on the market) | |

Method of the addition of an antisetting agent for aqueous paints:

Coatax WF-268, Cymel 370 and deionized water are mixed under stirring to give a clear paint. Iriodin 504 and the antisetting agent for aqueous paints (in the blank test, Iriodin 504 alone) are added to this, and dispersed by a T.K. autohomomixer (made by Tokushu Kika Kogyo Co., Ltd., type M, diameter of the blade: 4 cm) (2,000 rpm×15 minutes).

Viscosity and TI value:

The viscosities (CPS) at 25° C. and 60 rpm and at 25° C. and 6 rpm of the resultant paint are measured using a B-type viscometer, and the ratio (viscosity at 6 rpm/viscosity at 60 rpm) is calculated. The larger the value of the ratio (TI value) is, the larger the thioxotropy is.

Settling-preventing properties

The paint is diluted with deionized water so that the viscosity measured using a Ford cup #4 may be 40 seconds (25° C.), the diluted paint is transferred into a 250-ml glass bottle, and the percentage of the volume of the Iriodin which settled to the volume of the whole paint is measured.

The test resulted are shown in Table-3. From the results of Table-3, it is understood that when the antisetting agent for aqueous paints of the invention is added to the aqueous metallic paint, it exerts an excellent effect in the prevention of the settling of the metallic pigment.

TABLE 3

(Performance tests)

| Antisettling agent for aqueous paints | Before dilution | | Settling-preventing properties (%) | |
| --- | --- | --- | --- | --- |
| | 60 rpm | TI value | 3 days later | 10 days later |
| Blank | 230 | 0.95 | 12.7 | 10.8 |
| Example 1 | 438 | 1.60 | 99.4 | 88.5 |
| Example 2 | 726 | 2.12 | 99.4 | 94.0 |
| Example 3 | 966 | 2.65 | 100 | 97.1 |
| Example 4 | 386 | 1.24 | 99.7 | 98.2 |
| Example 5 | 260 | 1.15 | 94.5 | 31.5 |
| Example 6 | 714 | 1.71 | 100 | 97.6 |
| Example 7 | 768 | 2.01 | 100 | 100 |
| Example 8 | 650 | 1.38 | 99.4 | 80.9 |
| Example 9 | 460 | 1.85 | 61.0 | 49.4 |
| Example 10 | 632 | 1.94 | 98.8 | 94.3 |
| Comparative Example 2 | — | — | — | — |
| Comparative Example 3 | 151 | 0.96 | 18.1 | 15.0 |
| Comparative Example 4 | 455 | 1.05 | 19.8 | 16.7 |
| Product on the market | 349 | 0.96 | 15.6 | 15.6 |

[Note] As to Comparative Example 1, since the state was ununiform, the tests were not carried out, and as to Comparative Example 2, since the paint composition became a gel showing roping properties, the tests were stopped. The product on the market is Rheolate 2,000 made by Rheox Co.

I claim:

1. A polyamide antisettling agent for aqueous paints which is derived from a process which comprises:

(1) reacting a primary diamine having 2 to 12 carbon atoms with:

(a) a dimer unsaturated fatty acid, or (b) a mixture of a dimer unsaturated acid with one or more other dicarboxylic acid having 3 to 21 carbon atoms or one or more mono-carboxylic acid having 2 to 22 carbon atoms, or (c) a mixture of a dimer unsaturated fatty acid with one or more other dicarboxylic acid having 3 to 21 carbon atoms and one or more monocarboxylic acid having 2 to 22 carbon atoms, to obtain a polyamide reaction product, (2) neutralizing the polyamide reaction product with a neutralizing base, and (3) then dispersing the neutralized polyamide in an aqueous medium.

2. A polyamide antisettling agent for aqueous paints which is derived from a process which comprises (1) reacting a primary diamine having 2 to 12 carbon atoms with:

(a) a dimer unsaturated fatty acid, or (b) a mixture of a dimer unsaturated fatty acid with one or more other dicarboxylic acid having 3 to 21 carbon atoms or one or more monocarboxylic acid having 2 to 22 carbon atoms, or (c) a mixture of a dimer unsaturated fatty acid with one or more other dicarboxylic acid having 3 to 21 carbon atoms and one or more monocarboxylic acid having 2 to 22 carbon atoms, to obtain a polyamide reaction product having an acid value in the range of 30 to 120, wherein the mole ratio of the total carboxylic acids to the primary diamine is in the range of 5:4 to 2:1 and the mole ratio of the dimer unsaturated fatty acid contained in the total carboxylic acids is 50 mol % or more, (2) neutralizing the polyamide reaction product with a neutralizing base, and (3) then dispersing the neutralized polyamide in an aqueous medium.

3. The antisettling agent for aqueous paints according to claim 2 wherein the primary diamine is a member selected from the group consisting of ethylenediamine, 1,4-diaminobutane, hexamethylenediamine, 1,10-decamethylenediamine, 1,11-undecamethylenediamine, 1,12-dodecamethylenediamine, xylylenediamine and 4,4'-diaminodiphenylmethane.

4. The antisettling agent for aqueous paints according to claim 2 wherein the dicarboxylic acid is a member selected from the group consisting of succinic acid, glutaric acid, adipic acid, pimelic acid, suberic acid, azelaic acid, sebacic acid, dodecanedioic acid and isophthalic acid.

5. The antisettling agent for aqueous paints according to claim 2 wherein the monocarboxylic acid is a member selected from the group consisting of acetic acid, butyric acid, caproic acid, caprylic acid, capric acid, lauric acid, myristic acid, palmitic acid, stearic acid, behenic acid, 1,2-hydroxystearic acid and oleic acid.

6. The antisettling agent for aqueous paints according to claim 2 wherein the neutralizing agent is a member selected from the group consisting of triethylamine, 2-methylaminoethanol, sodium hydroxide and potassium hydroxide.

7. The antisettling agent for aqueous paints according to claim 1 wherein the mole ratio of the total carboxylic acids to the primary diamine is in the range of 5:4 to 2:1.

8. The antisettling agent for aqueous paints according to claim 1 wherein the mole ratio of the dimer unsaturated fatty acid contained in the total carboxylic acids is 50 mol % or more.

9. The antisettling agent for aqueous paints according to claim 1 wherein the acid value of the polyamide obtained by reacting the total carboxylic acids with the primary diamine is in the range of 30 to 120.

10. The antisettling agent for aqueous paints according to claim 1 wherein the primary diamine is a member selected from the group consisting of ethylenediamine, 1,4-diaminobutane, hexamethylenediamine, 1,10-decamethylenediamine, 1,11-undecamethylenediamine, 1,12-dodecamethylenediamine, xylylenediamine and 4,4'-diaminodiphenylmethane.

11. The antisettling agent for aqueous paints according to claim 1 wherein the dicarboxylic acid is a member selected from the group consisting of succinic acid, glutaric acid, adipic acid, pimelic acid, suberic acid, azelaic acid, sebacic acid, dodecanedioic acid and isophthalic acid.

12. The antisettling agent for aqueous paints according to claim 1 wherein the monocarboxylic acid is a member selected from the group consisting of acetic acid, butyric acid, caproic acid, caprylic acid, capric acid, lauric acid, myristic acid, palmitic acid, stearic acid, behenic acid, 1,2-hydroxystearic acid and oleic acid.

13. The antisettling agent for aqueous paints according to claim 1 wherein the neutralizing agent is a member selected from the group consisting of triethylamine, 2-methylaminoethanol, sodium hydroxide and potassium hydroxide.

* * * * *